United States Patent Office 3,689,378
Patented Sept. 5, 1972

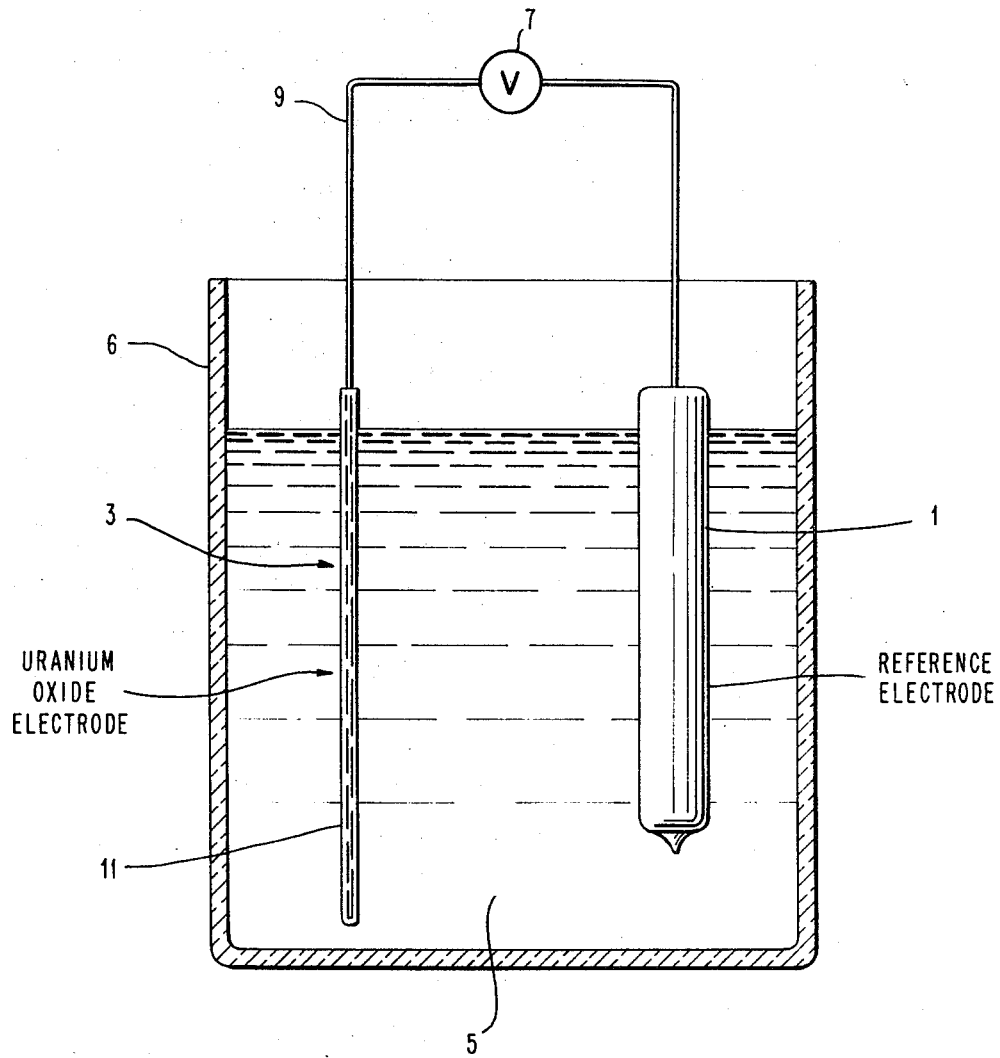

3,689,378
PROCESS AND APPARATUS FOR MEASURING pH
Gordon W. Neff, Mahopac, and Carlos J. Sambucetti, Mohegan Lake, N.Y., and John E. Tomko, Shelburne, Vt., assignors to International Business Machines Corporation, Armonk, N.Y.
Filed Jan. 15, 1969, Ser. No. 791,321
Int. Cl. B01r 3/02
U.S. Cl. 204—1 T    10 Claims

ABSTRACT OF THE DISCLOSURE

A high impedance voltmeter is coupled on one side to a standard reference electrode and on the other side to a pH sensitive uranium oxide ($U_3O_8$) electrode. The low electrical impedance uranium oxide electrode comprises a noble metal wire coated with a thin smooth layer of uranium oxide.

BACKGROUND OF THE INVENTION

The present invention relates to the measurement of hydrogen ion concentration (pH) and more particularly to the measurement of hydrogen ion concentration by determining the electrical potential developed at the junction of the sample solution and the ion sensitive member.

Conventional pH measuring systems, for the most part, depend in their operation on some form of a pH sensitive glass member to sense the hydrogen ion activity. For example, a common technique employs a reference electrode containing an internal half-cell to contact the sample via a liquid junction. A sensing electrode carrying an ion sensitive glass membrane and another internal half-cell contacts the sample at the glass membrane. An electrical potential is developed at the surface of the glass membrane in contact with the sample and the magnitude of the potential varies as a function of the ion concentration in the sample. This potential is normally determined by measuring the difference existing between the half-cells.

The difficulty with such systems lies in the characteristics of the ion sensitive glass member. One of the major difficulties of the glass member is that it exhibits a high electrical impedance. Because of the high electrical impedance, any measurement using the glass as the sensing member requires a somewhat costly high impedance amplifier for reading the sensing member output. In addition to requiring a high impedance amplifier, such systems require considerable time for the system to respond to provide an indication on the amplifier output.

Not only do glass sensitive members have the disadvantages of being slow in response and requiring cumbersome and costly equipment, they are also brittle, thus lacking ruggedness and the ability to be easily or minutely configured.

SUMMARY OF THE INVENTION

In accordance with the present invention a novel pH sensitive system is provided employing a new ion sensitive member which is not vitreous in nature and which exhibits a low electrical impedance. As provided by the present invention the ion sensitive member comprises a nobel metal wire, such as platinum, coated with a smooth film of uranium oxide. It has been found that an ion sensitive member thus composed exhibits unusual ion sensitivity which is highly reproducible.

It is therefore an object of this invention to provide an improved pH measuring device.

It is an additional object of this invention to provide a pH measuring device which is rapid in response thus allowing utilization with electronic information handling equipment.

It is a further object of this invention to provide a pH measuring device having a low impedance sensing member.

It is yet a further object of this invention to provide an improved pH measuring system which in addition to being rapid in response is low in cost.

It is yet another object of this invention to provide a rapid response pH measuring system having a rugged and easily configured sensing member.

The foregoing and other objects, features and advantages of the invention will be apparent from the following more particular description of a preferred embodiment of the invention, as illustrated in the accompanying drawing.

BRIEF DESCRIPTION OF THE DRAWING

The figure illustrates the preferred embodiment of the novel pH measuring system of the present invention.

DESCRIPTION OF THE PREFERRED EMBODIMENT

With reference to the figure there is depicted a reference electrode 1 and a pH sensing member or electrode 3, each making contact with test sample 5 in container 6. Reference electrode 1 may be any of a variety of well known reference electrodes, such as the conventional calomel reference electrode, which are themselves substantially non-responsive to variations in the hydrogen ion concentration of the sample under test. Coupled between reference electrode 1 and sensing electrode 3 is a high impedance voltmeter 7. It is clear that the configuration thus far broadly described is basic and in common with known electrically operated pH measuring systems. In such an arrangement the electrical potential developed between the two electrodes is the net or algebraic sum of the individual electrochemical potentials developed by each electrode.

In accordance with the teachings of the present invention there is employed a new and improved pH sensing member, which member exhibits a low electrical impedance. Because of this low impedance a pH measuring system is provided which is rapid in response and low in cost. Not only does this novel sensing member exhibit low electrical impedance but it also exhibits ruggedness as well as qualities which allow more ease and flexibility in the fabrication of electrode configurations. Thus, the sensing member may be fabricated in the form of a fine needle shaped probe, or a flat plate or a cylindrical flow-through type electrode. Other configurations are obviously available.

With reference to the preferred embodiment illustrated in the figure, there is shown a sensing electrode 3 comprising wire 9, such as iridium coated with a thin, smooth coating of uranium oxide ($U_3O_8$).

The basic method used in fabricating novel sensing electrode 3 of the preferred embodiment is relatively simple. Noble metals, such as platinum, iridium or rhodium, are preferably employed as the wire support conductor because of their high melting point and their inactive qualities especially toward oxygen. It is clear, however, that any metal or metal alloy that has a sufficiently high melting point and that is relatively free from a tendency to undergo oxidation may be used. The starting material for the uranium oxide coating is preferably uranyl nitrate [$UO_2(NO_3)_2 6H_2O$]. However, other soluble uranium salts, such as uranium acetate, may also be used. The uranyl nitrate crystals melt at 60° C. and at about 80° C. form a fluid of low viscosity. An iridium wire, for example is dipped in the molten crystal and flamed at 900° C. to 1000° C. Uranyl nitrate is thus converted to uranium oxide on the surface of the iridium wire.

The above procedure is repeated several times until a thin, smooth coating covers all the exposed iridium wire surface.

In accordance with the present invention it has been found that an insoluble member thus constituted exhibits accurate and reproducible pH sensitivity. This is demonstrated by reference to the following table wherein pH, as measured with the uranium oxide sensing member, is compared with standard solution pH.

TABLE

| Solution pH: | Uranium oxide |
|---|---|
| 7.41 | 7.41 |
| 10.00 | 10.08 |
| 12.00 | 11.65 |
| 13.00 | 12.79 |
| 7.41 | 7.45 |
| 4.00 | 4.05 |

The plot of voltage response of the uranium oxide electrode member of the figure for solutions of different composition and varying pH were found to follow a Nernst equation $$E = E_0 - S \text{ pH}$$

where S is 0.058 volt per pH unit. The linearity of this plot was found to be high between pH 4 and pH 9. Accordingly, the electrode is well suited for measuring pH and $pCO_2$ in blood and other physiological fluids.

It is to be noted that electrodes made using a flaming temperature from 600° C. to 800° C. were made and found to be likewise hydrogen ion sensitive. It is clear, however, that at these lower temperatures the $UO_2$ and $UO_3$ forms of uranium oxide are more in evidence and the surface layer of electrodes thus made is more soluble. Thus, it is evident that for the electrode purposes, as taught by the present invention, temperatures from 900° C. to 1200° C. provide the better electrodes. In such a temperature range the traces of $UO_2$ and $UO_3$ are minimal, and the surface layer of the electrode is highly insoluble, thus providing a more desirable electrode.

Although the electrode, as described, is advantageously in the form of a metal wire coated with a thin layer of uranium oxide, it is clear that other forms are possible. It is evident that the disclosed wire arrangement provides a convenient way of simultaneously supporting the uranium oxide and making the necessary ohmic contact. However, it is obvious that a body of uranium-uranium oxide, obtained by oxidizing the surface of a body of uranium, may also be used. In such an arrangement the uranium acts as a support for the uranium oxide and provides a convenient ohmic contact.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A pH sensitive electrode comprising insoluble uranium oxide of the $U_3O_8$ oxide form coated on an iridium wire for obtaining an electrical manifestation therefrom indicative of the pH of substances in contact therewith, the pH of which is to be determined.

2. In a pH measuring device including a pH sensing member, said pH sensing member comprising a coating of uranium oxide of the $U_3O_8$ oxide form coating an iridium wire so as to permit an electrical manifestation to be obtained therefrom indicative of the pH of substances in contact therewith, the pH of which is to be measured.

3. A process for sensing the pH of a substance, whereby the improvement comprises using a surface of insoluble uranium oxide of the $U_3O_8$ oxide form with an ohmic contact thereto as a pH sensitive electrode by contacting said surface with said substance and obtaining between said ohmic contact and a reference electrode contacting said substance an electrical manifestation indicative of the pH of said substance.

4. The process as set forth in claim 3 wherein said ohmic contact comprises a noble metal.

5. The process as set forth in claim 4 wherein said noble metal is in the form of a wire and said surface of uranium oxide comprises a coating on said wire.

6. In a process for measuring the pH of a substance, the improvement comprising using a surface of insoluble uranium oxide of the $U_3O_8$ oxide form fabricated on an electrically conductive body as a pH sensitive electrode by contacting said surface with said substance and obtaining between said body and a reference electrode contacting said substance an electrical manifestation indicative of the pH of said substance.

7. The process as set forth in claim 6 wherein said conductive body comprises a noble metal.

8. The process as set forth in claim 7 wherein said metal is in the form of a wire and said surface of uranium oxide comprises a coating on said wire.

9. In a pH measuring system including a reference electrode and sensing electrode to be contacted with a test sample, said sensing electrode comprising insoluble uranium oxide of the $U_3O_8$ form coated on an iridium wire.

10. In a pH measuring system a high impedance voltmeter coupled at one terminal to an ion sensing electrode and coupled at the other terminal to a reference electrode, said ion sensing electrode comprising a coating of uranium oxide of the $U_3O_8$ oxide form coating an iridium wire.

References Cited

UNITED STATES PATENTS

| 2,276,864 | 3/1942 | Pearson | 117—220 X |
| 2,784,486 | 3/1957 | Langer et al. | 204—38 R X |
| 3,219,849 | 11/1965 | Webb | 310—3 |
| 3,325,378 | 6/1967 | Greene et al. | 204—290 R |

HOWARD S. WILLIAMS, Primary Examiner

R. J. FAY, Assistant Examiner

U.S. Cl. X.R.

204—1.5, 195 R, 195 F, 290 R